(12) United States Patent
Arora et al.

(10) Patent No.: US 11,889,352 B2
(45) Date of Patent: *Jan. 30, 2024

(54) INTELLIGENT AND OPTIMAL RESOURCE SELECTION WITHIN A NETWORK SLICE

(71) Applicant: Cisco Technology, Inc., San Jose, CA (US)

(72) Inventors: Ankush Ganpatrai Arora, Maharashtra (IN); Rajaneesh Sudhakar Shetty, Karnataka (IN); Ananya Simlai, Bangalore (IN); Vinay Saini, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/675,190

(22) Filed: Feb. 18, 2022

(65) Prior Publication Data
US 2022/0174542 A1 Jun. 2, 2022

Related U.S. Application Data

(63) Continuation of application No. 16/536,555, filed on Aug. 9, 2019, now Pat. No. 11,297,534.

(51) Int. Cl.
*H04W 28/08* (2023.01)
*H04W 16/02* (2009.01)
(Continued)

(52) U.S. Cl.
CPC ........... *H04W 28/08* (2013.01); *H04W 16/02* (2013.01); *H04W 72/04* (2013.01); *H04W 72/542* (2023.01)

(58) Field of Classification Search
CPC ..... H04W 28/08; H04W 72/54–72/543; H04L 67/1001–67/1038
See application file for complete search history.

(56) References Cited

U.S. PATENT DOCUMENTS 10,862,805 B1    12/2020  Dods et al.
11,297,534 B2 *   4/2022  Arora ................ H04W 72/542
(Continued)

FOREIGN PATENT DOCUMENTS

CN    106922002 A      7/2017
WO    2018/127148 A1   7/2018
WO    2019032968 A1    2/2019

OTHER PUBLICATIONS

Rost, et al., "Network Slicing to Enable Scalability and Flexibility in 5G Mobile Networks," IEEE Communications Magazine, vol. 55, Issue 5, May 2017, 8 pages.
(Continued)

*Primary Examiner* — Hoon J Chung
(74) *Attorney, Agent, or Firm* — Edell, Shapiro & Finnan, LLC

(57) ABSTRACT

A method is provided for use in a network that includes a plurality of user plane functions that perform processing of user plane traffic sessions from one or more mobile wireless user devices. The method includes periodically monitoring resource utilization of the plurality of user plane functions to estimate a resource utilization level of respective user plane functions. Based on the periodically monitoring, the method further includes storing for the respective user plane functions a resource utilization level indicator for each of the respective user plane functions according a resource utilization level of the respective user plane functions. User plane traffic sessions for a given tracking area are re-assigned (moved) among the plurality of user plane functions based on the resource utilization level indicators for the respective user plane functions to achieve a desired quality of experience for the user plane traffic sessions.

20 Claims, 9 Drawing Sheets

(51) Int. Cl.
*H04W 72/04* (2023.01)
*H04W 72/542* (2023.01)

(56) References Cited

U.S. PATENT DOCUMENTS

| | | |
|---|---|---|
| 2016/0112896 A1 | 4/2016 | Karampatsis et al. |
| 2017/0054595 A1 | 2/2017 | Zhang et al. |
| 2017/0366399 A1 | 12/2017 | Li et al. |
| 2018/0317134 A1 | 11/2018 | Leroux et al. |
| 2019/0075431 A1 | 3/2019 | Albasheir et al. |
| 2019/0281494 A1 | 9/2019 | Chan et al. |
| 2020/0314672 A1 | 10/2020 | Farooq |

OTHER PUBLICATIONS

Geng, et al., "Network Slicing Architecture," draft-geng-netslices-architecture-01, IETF, Network Working Group, Internet-Draft, Jun. 2017, 20 pages.

Sheriff, et al., "Efficiently Allocating Radio Resources in the Downlink Direction To Meet Quality of Service Requirements of 5G Wireless Networks," Technical Disclosure Commons, https://www.tdcommons.org/dpubs_series/1283, Jun. 26, 2018, 8 pages.

* cited by examiner

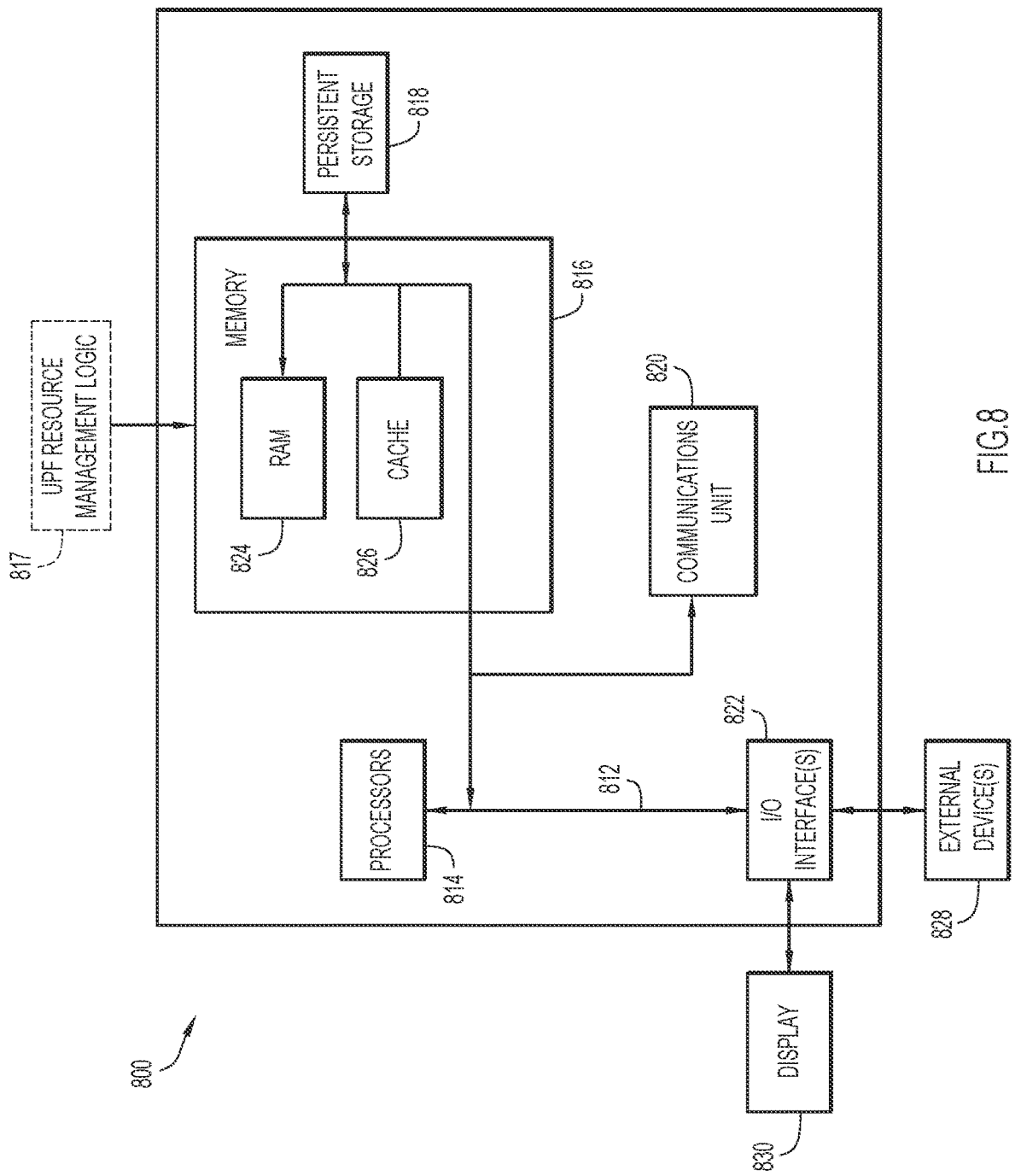

INTELLIGENT AND OPTIMAL RESOURCE SELECTION WITHIN A NETWORK SLICE

CROSS-REFERENCE TO RELATED APPLICATIONS

This application is a continuation of U.S. application Ser. No. 16/536,555, filed Aug. 9, 2019, the entirety of which are hereby incorporated by reference herein.

TECHNICAL FIELD

The present disclosure relates to mobile networks and resource selection within network slices.

BACKGROUND

The fifth generation (5G) mobile network technology has solved the problem of guaranteeing end user experience by allowing operators to separate devices that seek a different Quality of Service (QoS). However, this comes at a risk of lowering efficiency, as well as requiring massive investments that would be needed to independently manage the slices.

BRIEF DESCRIPTION OF DRAWINGS

FIG. 8 is a block diagram of a computing device that may be configured to perform the resource selection techniques presented herein, according to an example embodiment.

DESCRIPTION OF EXAMPLE EMBODIMENTS

Overview

Presented herein are intelligent resource selection mechanisms within a selected network slice that are feedback oriented, dynamic in nature and driven by intelligent analytics. These algorithms prevent resource starvation for critical applications and at the same time save costs by eliminating over-allocation, saving power and optimizing data center space requirements.

According to an example embodiment, a method is provided for use in a network that includes a plurality of user plane functions that perform processing of user plane traffic sessions from one or more mobile wireless user devices. The method includes periodically monitoring resource utilization of the plurality of user plane functions to estimate a resource utilization level of respective user plane functions. The method further includes storing for the respective user plane functions a resource utilization level indicator for each of the respective user plane functions according a resource utilization level of the respective user plane functions. User plane traffic sessions for a given tracking area are re-assigned (moved) among the plurality of user plane functions based on the resource utilization level indicators for the respective user plane functions to achieve a desired quality of experience for the user plane traffic sessions.

Example Embodiments

Intelligent resource selection mechanisms are provided for use within a selected network slice of a network using feedback to be dynamic in nature and driven by analytics. In modern mobile networks, network slicing is particularly useful when implemented in an end-to-end manner in order to meet the service level QoS demands. Such network slicing would broadly include slicing of the radio access network (RAN), slicing of the mobile core network and slicing of the backhaul.

Figure 1:
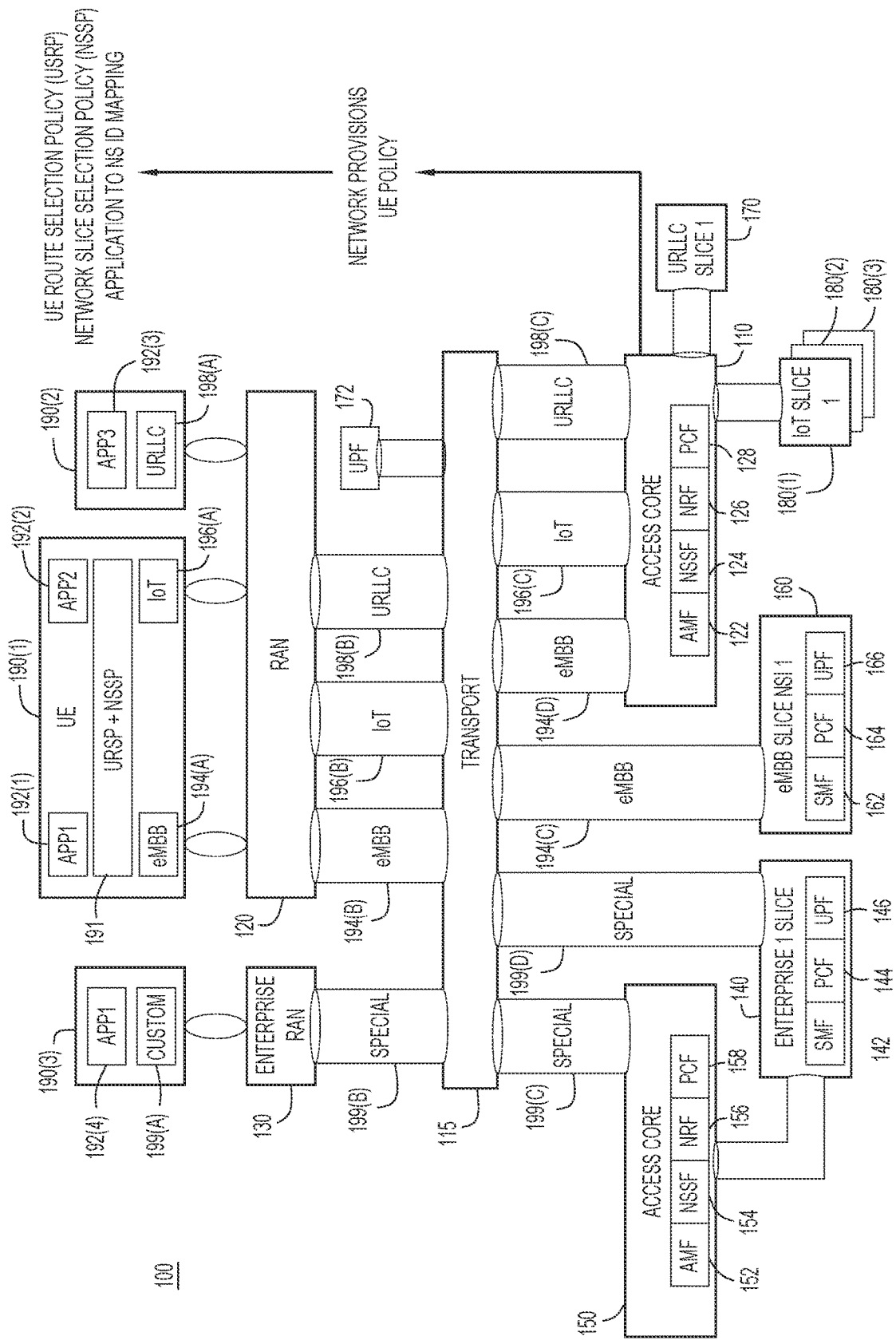
FIG. 1 is a block diagram of a mobile network having a network slicing architecture and for which the resource selection techniques presented herein may be employed, according to an example embodiment.

FIG. 1 illustrates an example of a mobile network 100 having a network slicing architecture. The network 100 includes an access core 110, a transport portion 115 and a radio access network (RAN) 120. The access core 110 includes various control plane functions, including an Access and Mobility Management Function (AMF) 122, Network Slice Selection Function (NSSF) 124, a Network Function (NF) Network Repository Function (NRF) 126 and a Policy Control Function (PCF) 128.

FIG. 1 also shows multiple different network slices, as well as a separate enterprise RAN 130. As an example, there is a first enterprise slice 140 that includes a dedicated Session Management Function (SMF) 142, a dedicated PCF 144 and a dedicated User Plane Function (UPF) 146. There is also a separate/private access core 150 for the first enterprise slice 140. The access core 150 includes its own AMF 152, NSSF 154, NRF 156 and PCF 158. Traffic for the first enterprise slice 140 is directed via the enterprise RAN 130.

There is a first Enhanced Mobile Broadband (eMBB) slice 160 in the network 100. The first eMBB slice 160 includes a dedicated SMF 162, PCF 164 and UPF 166. eMBB is one of several use cases for a mobile network, and includes data-driven use cases often using high data rates across a wide coverage area. The eMBB use cases span a range of hardware requirements. The network 100 further includes a first Ultra Reliable Low Latency Communications (URLLC) slice shown at 170 that includes a dedicated UPF 172. URLLC uses cases have strict requirements on latency and reliability for mission critical communications, such as medical/health care applications, autonomous vehicles, etc. Finally, the network 100 includes several IoT slices 180(1), 180(2) and 180(3). The IoT slices may be referred to as Massive Machine Type Communications (mMTC) use cases that support a very large number of devices in a small area, which may only send data sporadically.

FIG. 1 shows that the transport portion 115 is sliced. For example, a virtual local area network (VLAN) may be set up with reserved bandwidth, routing and resiliency, for a given network slice. This would be configured by a network management entity (not shown). The transport portion 115 reports the UE allowed network slice identifier (NS ID) to the RAN 120.

The access core 110 provisions UE policy, as shown in FIG. 1. These UE policies include a UE Route Selection Policy and Network Slice Selection Policy, as well as Application (App) to NS ID mapping. For example, UE 190(1) is configured with a USRP and NSSP as shown at 191, and is running two applications (App1) 192(1) and (App2) 192(2). As an example, App1 192(1) may be served over the first eMBB slice 160 as shown at 194A, 194B, 194C and 194D. In addition, App2 192(2) may be served over one of the IoT slices 180(1)-180(3), as shown at 196A, 196B and 196C.

UE 190(2) is shown as running App3 192(3) which is served over the first URLLC slice 170 as shown at 198A, 198B and 198C. Finally, UE 190(3) is shown running App4 192(4), which is served by the first enterprise slice 140 as shown at 199A, 199B, 199C and 199D.

The resources pertaining to each of these slices may be hybrid in nature in terms of the hardware, capability, performance etc. A UE may have a maximum number of slices and the number of applications that will be catered by these slices may be many. It is therefore inevitable that each of the slices will be used by the operators to cater to multiple use cases and different QoS levels.

In such a scenario, the usage of the hardware and software resources within the slice should be intelligent and efficient to improve the Average Revenue Per User (ARPU) and end user experience. Without such consideration, guaranteed service level agreement (SLA) and Quality of Experience may not be optimal due to improper utilization of underlying hardware and software resources. The hardware for the UPFs will likely not be uniform. There will be an evolution of hardware having a range of capabilities, which will further impact resource utilization.

Mechanisms are presented herein that address these challenges by dynamically allocating the hardware/software resources and enhancing Quality of Experience for different applications within the same slice.

Figure 2:
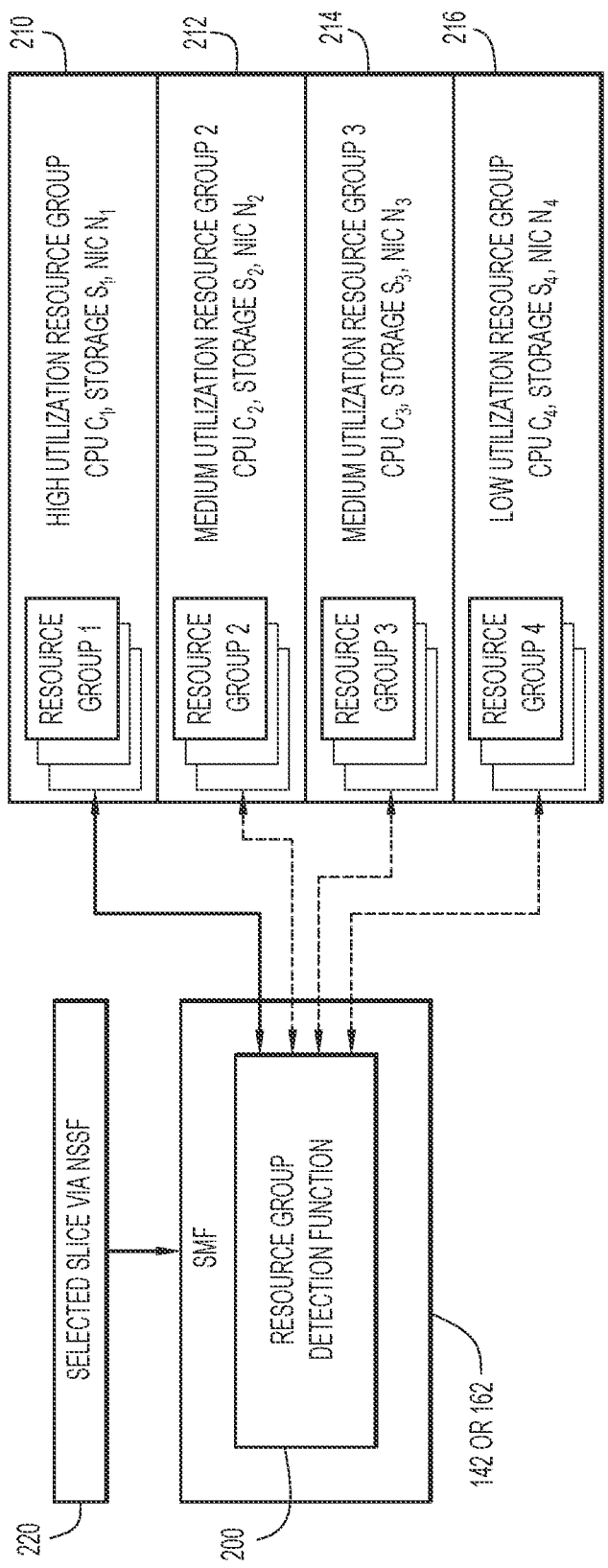
FIG. 2 is a functional diagram of a resource group detection function performed by a session management function in the mobile network, according to an example embodiment.

Reference is now made to FIG. 2, with continued reference to FIG. 1. FIG. 2 illustrates the role of a Resource Group Detection Function (RGDF) as part of these mechanisms. The RGDF is shown at 200 in FIG. 2, and it may be one of the operations performed by the SMF, such as by SMF 142 and/or SMF 162 shown in FIG. 2. The RGDF 200 defines resource groups within a slice and maps/assigns appropriate user sessions to resource groups based on utilization of the resource groups. For example, a first resource group (Group 1) 210 may be defined for high utilization of resources in terms of central processing unit (CPU) usage denoted $C_1$, storage usage denoted $S_1$ and network interface (bandwidth) usage denote $N_1$. A second resource group (Group 2) 212 may be defined for first medium utilization of resources, denoted $C_2$, $S_2$ and $N_2$. A third resource group (Group 3) 214 may be defined for second medium utilization of resources (lower than that of the second resource group), denoted $C_3$, $S_3$ and $N_3$. Finally, a fourth resource group (Group 4) 216 may be defined for second medium utilization of resources (lower than that of the second resource group), denoted $C_4$, $S_4$ and $N_4$. These resource groups are a means of categorizing utilization level of a resource, e.g., a UPF.

As shown at 220, the SMF 142 or 162 executes the RGDF 200 for a selected slice. The selection of a network slice for a particular Packet Data Network (PDN) session is the role of the NSSF 124 (shown in FIG. 1). Slice selection may be based on QoS requirements of the PDN bearers and/or an operator-determined slice for a particular set of applications.

As explained in more detail below, analytics and closed loop feedback are used from various network functions to determine their utilization and move a particular PDN session to its most suitable UPF resource. Initial UPF resource selection may use a round-robin algorithm to ensure the number of sessions at any given time is equally distributed.

The SMF audits the resource utilization of UPFs for user plane sessions in a given tracking area identifier (TAI)—an area where all the user sessions are connected to the same SMF. This audit is repeated periodically. A goal of the mechanisms presented herein is to group UPF resources based on their utilization, and then relocate user sessions across the UPFs based on the UPF resource utilization. The SMF periodically monitors the utilization of the UPFs and categorizes them among multiple utilization categories. If there is a high usage use session that is assigned to a high utilization group (for a long time), the SMF moves that session to a lower utilization group, and vice versa.

Figure 3A:
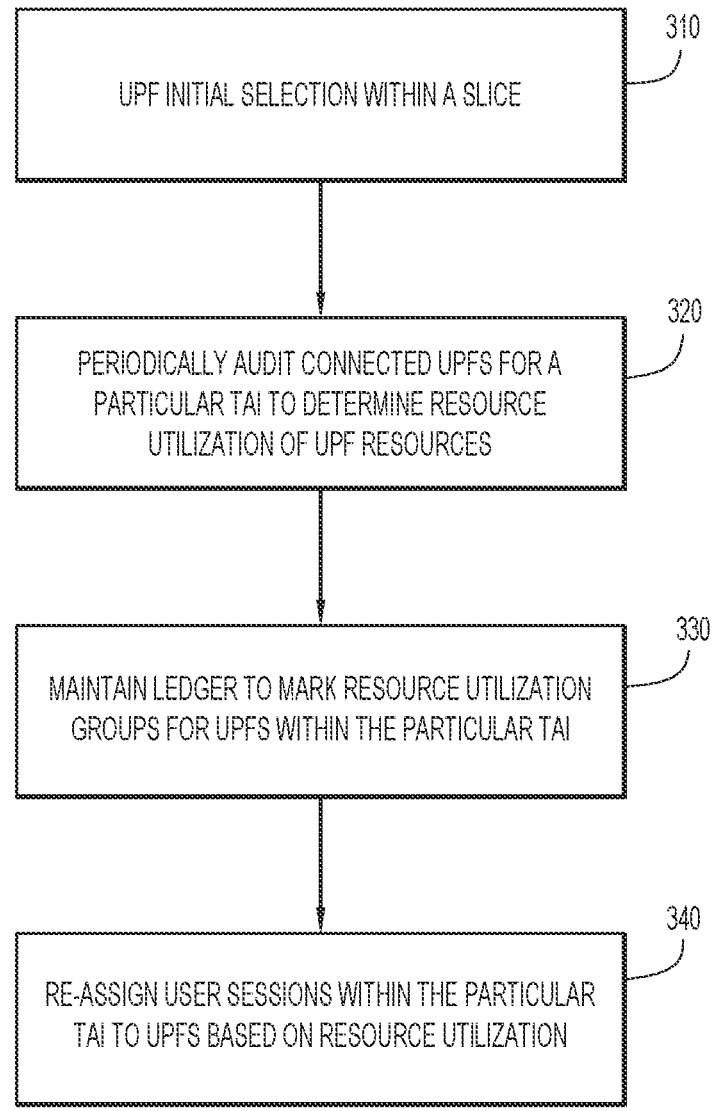
FIG. 3A is a flow chart illustrating operations performed by the session management function for resource selection, according to an example embodiment.
Figure 3B:
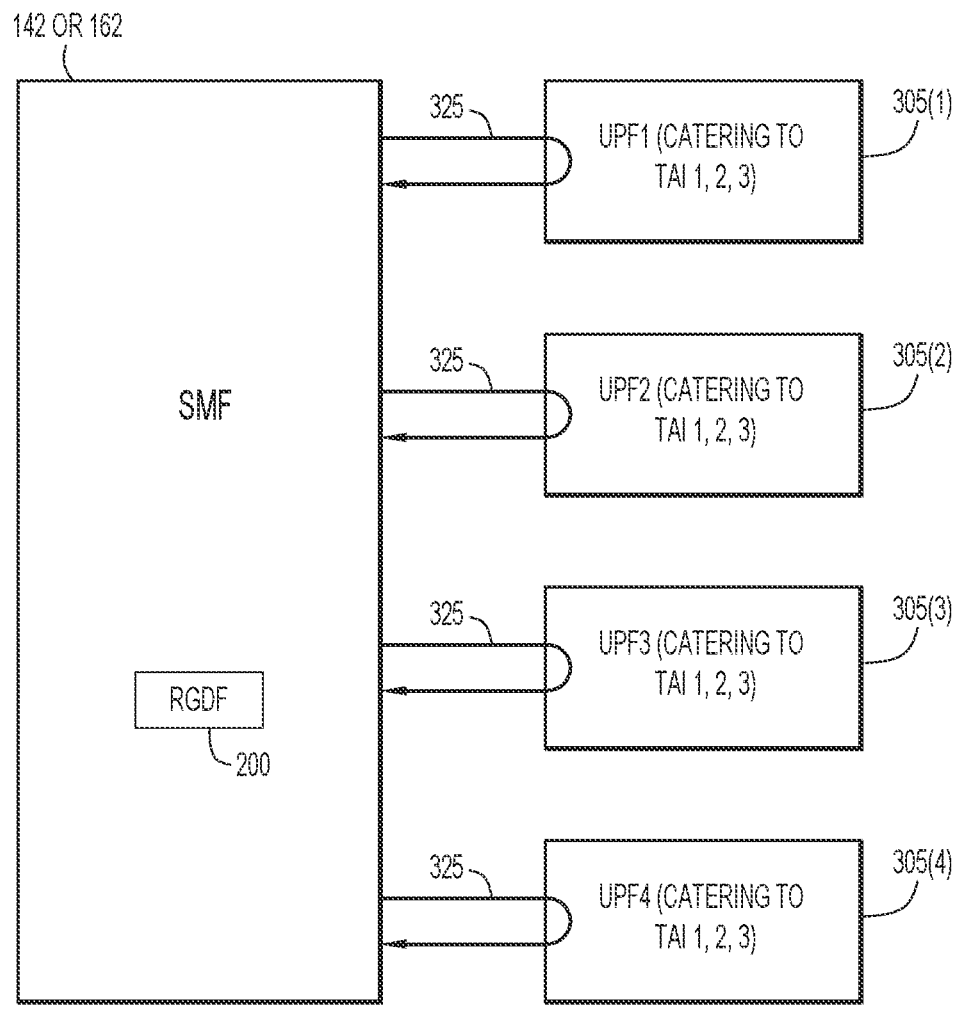
FIG. 3B is a diagram depicting operations performed in monitoring resource utilization of user plane functions, according to an example embodiment.

Turning now to FIGS. 3A and 3B, the operations of the RGDF 200 in the SMF 142 or 162 are further described. FIG. 3A is a flow chart for a process 300 performed by the RGDF 200 and FIG. 3B is a diagram graphically illustrating some of these operations with respect to UPF1-UPF4 denoted by reference numerals 305(1)-305(4). At 310, the UPF initial selection within a slice initially uses a selection algorithm, such as a round robin algorithm. In other words, for new user plane traffic sessions within a slice for the given tracking area, the SMF initially selects UPFs that have lower resource utilization, on a round-robin basis, for example.

At 320, the SMF 142 or 162, via the RGDF 200, periodically audits the connected UPFs for a particular tracking area (e.g., a particular TAI) to estimate the resource utilization within the connected UPFs. The audit of the hardware/software resource utilization of the UPFs is performed by the SMF or Network Function Virtualization (NFV) hosting the SMF/UPFs using Application Programming Interfaces (APIs) shown at 325 in FIG. 3B. It is possible, and likely, that the hardware for UPF1 would have different configurations than that for UPF2, UPF3 and so on. It is desirable to push the utilization of the UPFs to a median. Resource utilization is measured on Key Performance Indicators (KPIs) of network throughput (of a NIC) bandwidth, CPU utilization, and memory utilization.

At 330, the SMF 142 or 162 maintains a ledger to mark/categorize the UPFs as High, Medium, or Low resource utilization within a Particular TAI and updates the ledger periodically after each audit to re-categorize these UPFs. The ledger maintained by the SMFs can be shared across the network for learning and adaptable algorithms that can be further used for feedback/optimization within the network. At 340, the SMF re-arranges/re-groups the user sessions within the TAI across the UPFs based on the UPF resource utilization. Within the network slice, based on the application usage history, it is possible to provide low utilized resources to an application for better Quality of Experience.

Figure 4:
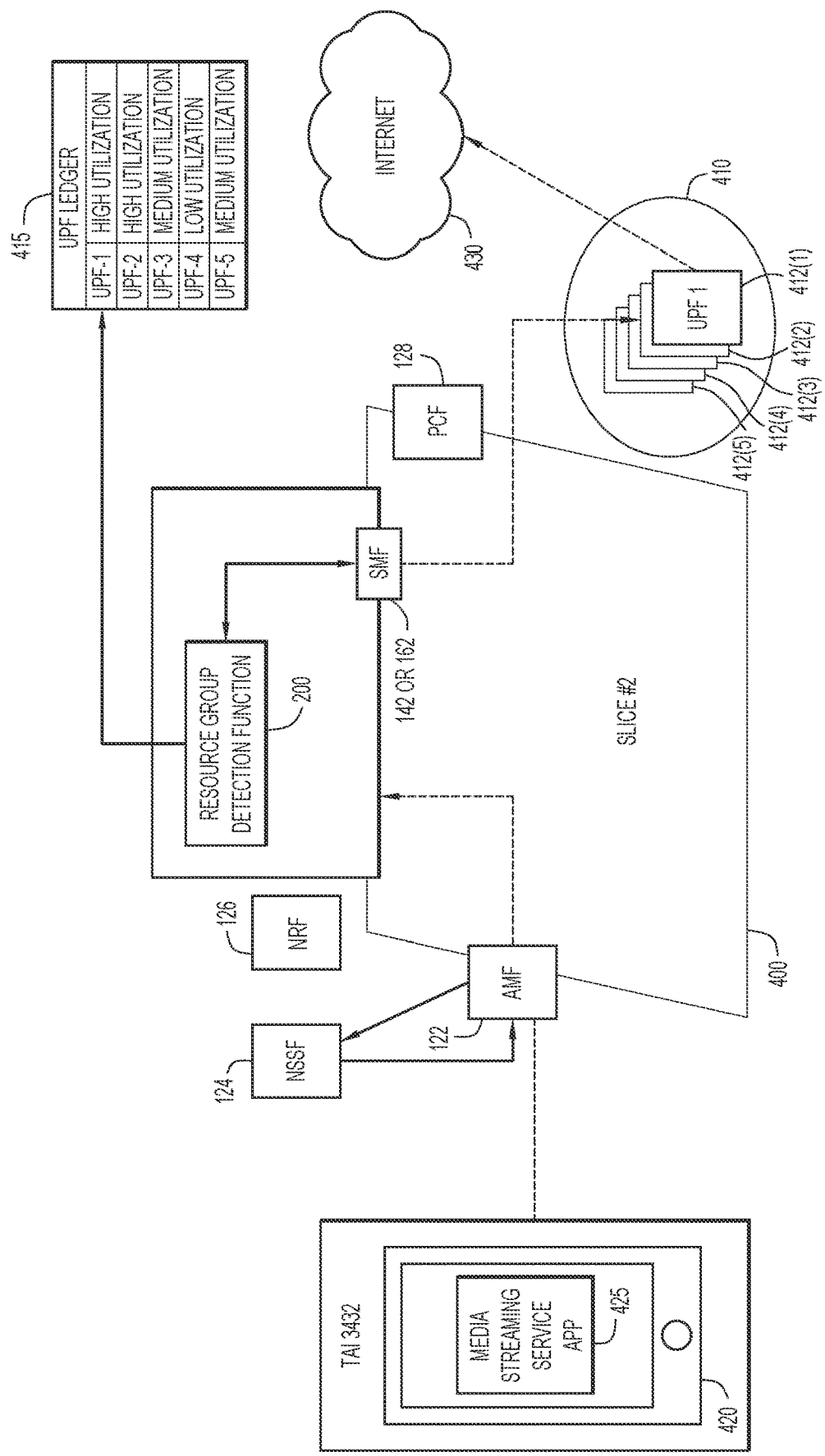
FIG. 4 is a diagram depicting operations performed in storing in a ledger a mark or indicator of resource utilization for user plane functions handling sessions associated with a tracking area, according to an example embodiment.

With reference to FIG. 4, a description is now provided of the operations of a resource group detection function 200 of the SMF 142 or 162, to periodically categorize the UPFs belonging to a particular TAI/region within a slice. The periodicity of the action to be performed can be operator configurable.

FIG. 4 shows an arbitrary slice, denoted slice #2 shown at reference numeral 400 and a plurality of UPFs 410(1)-410(5) that serve user plane traffic sessions for TAI "3432" shown at 412. The SMF maintains a ledger 415 to mark the utilization of the UPFs 410(1)-410(5) as being High, Medium, or Low within a Particular TAI and periodically updates the ledger 415 after each audit to re-categorize the utilization level of the UPFs 410(1)-410(5). There is a UE 420 operating in TAI "3432" as shown in FIG. 4. The UE 420 is operating a media streaming service application 425, for example. The UPFs 410(-1)-410(5) have connectivity to the Internet 430. The marking of the ledger 415 serves as a means for storing, for the respective user plane functions, a resource utilization level indicator for each of the respective user plane functions according a resource utilization level of the respective user plane functions.

In one example, there are two operator configurable utilization level thresholds, "*Threshold_for_High_UPF_utilization*" and "*Threshold_for_low_UPF_utilization*" used to facilitate marking the UPFs 410(1)-410(5) into 3 resource utilization categories/groups as HIGH, MEDIUM and LOW utilization UPFs.

For example, the "*Threshold_for_High_UPF_utilization*" =80% means that if the hardware utilization, e.g., CPU utilization and memory utilization, for the UPF, is greater than 80%, then the SMF 142 or 162 will mark the UPF as a HIGH Utilization UPF in the ledger 415.

The "*Threshold_for_low_UPF_utilization*" =30% means that if the hardware utilization, e.g., CPU utilization and memory utilization, for the UPF is less than 30%, then the SMF will mark the UPF as a LOW Utilization UPF in the ledger 415.

The SMF 142 or 162 will mark UPFs as MEDIUM utilization UPFs in the ledger 415 if their utilization does not exceed the "*Threshold_for_High_UPF_utilization*" and is not less than the "*Threshold_for_low_UPF_utilization*".

As an example, as shown in FIG. 4, at a given update cycle, the SMF 142 or 162 marks the UPF ledger 415 for UPF-1 as being HIGH utilization, for UPF-2, as being HIGH utilization, UPF-3 as being MEDIUM utilization, UPF-4 as being LOW utilization and UPF-5 as being MEDIUM utilization.

For any new incoming user plane session request within a slice for a particular TAI, the SMF 142 or 162 selects the set of LOW utilization UPFs and initially distributes the sessions among them in a round-robin fashion. If there are no low utilization UPFs in the ledger then the MEDIUM utilization UPFs will be selected and the sessions will be assigned to them in a round-robin fashion.

Figure 5:
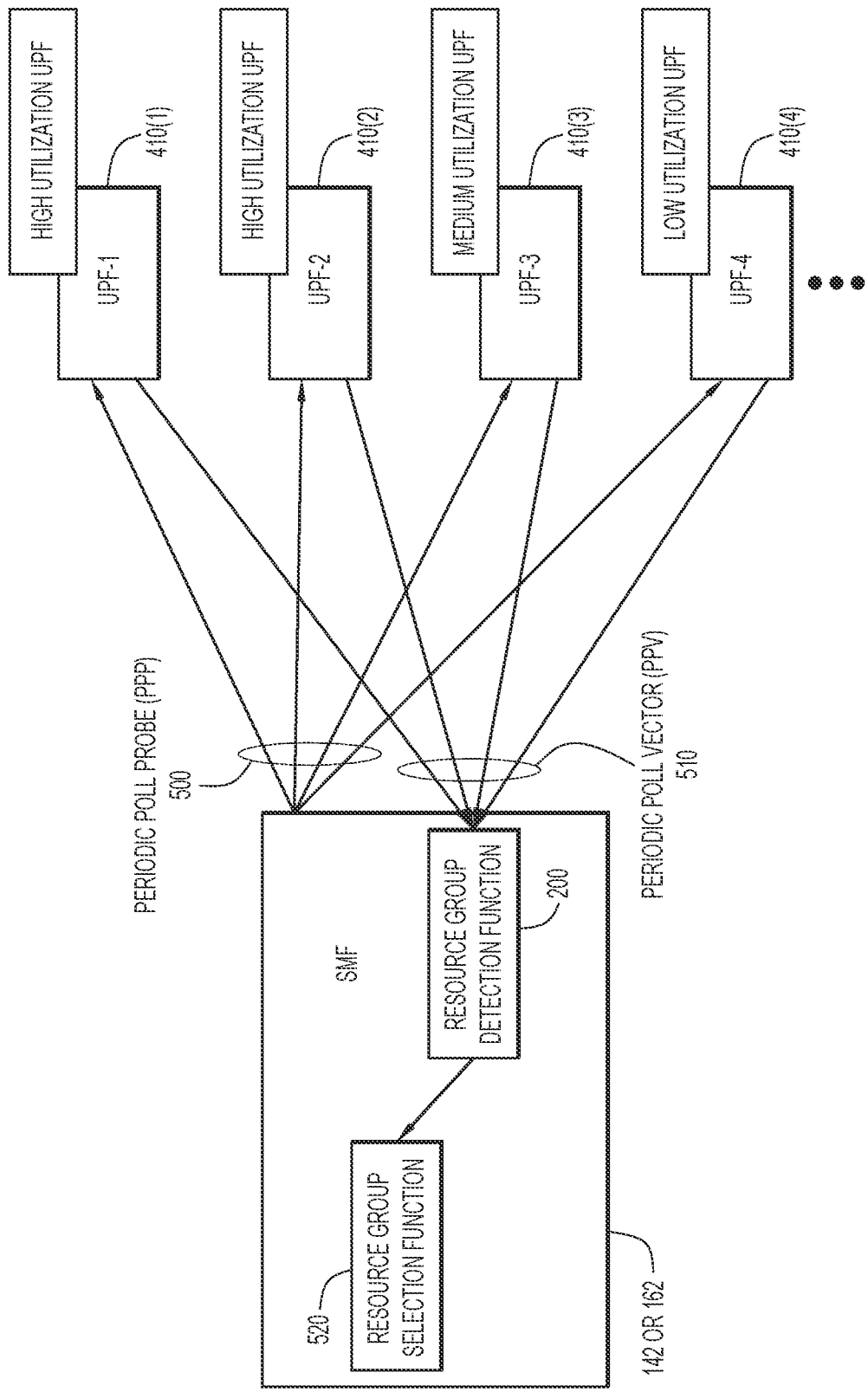
FIG. 5 is a diagram depicting operations performed to periodically poll user plane functions to obtain resource utilization information, according to an example embodiment.

Reference is now made to FIG. 5 for a description of the periodic polling and utilization categorization operations of the SMF 142 or 162. The SMF 142 or 162 performs a periodic audit on the UPFs to monitor the session manager utilization for different utilization categories of UPFs. The RGDF 200 of the SMF 142 or 162 sends a periodic poll probe (PPP) 500 to the UPFs. For example, the PPP 500 is sent to a session manager utilization function of the UPFs. Each UPF responds with a periodic poll vector (PPV) 510. An example of the content of the PPV 510 is depicted in the table below.

| Periodic Poll Vector (PPV) | |
|---|---|
| Total CPUs in a UPF | Average CPU Utilization in a UPF since last poll |
| Total Memory in a UPF | Average Available Memory in a UPF since last poll |
| Supported Network Speed | Average Network Throughput since last poll |

FIG. 5 shows UPFs 410(1)-410(4) as an example, and their associated utilization category determined based on the PPV received from each UPF by the RGDF 200. Again, the RGDF 200 categorizes each UPF as having HIGH, MEDIUM or LOW utilization, based on the PPV 510 received from each UPF at a given update cycle. FIG. 5 also shows a Resource Group Selection Function 520 that selects one of the low utilization UPFs for handling new sessions.

Figure 6:
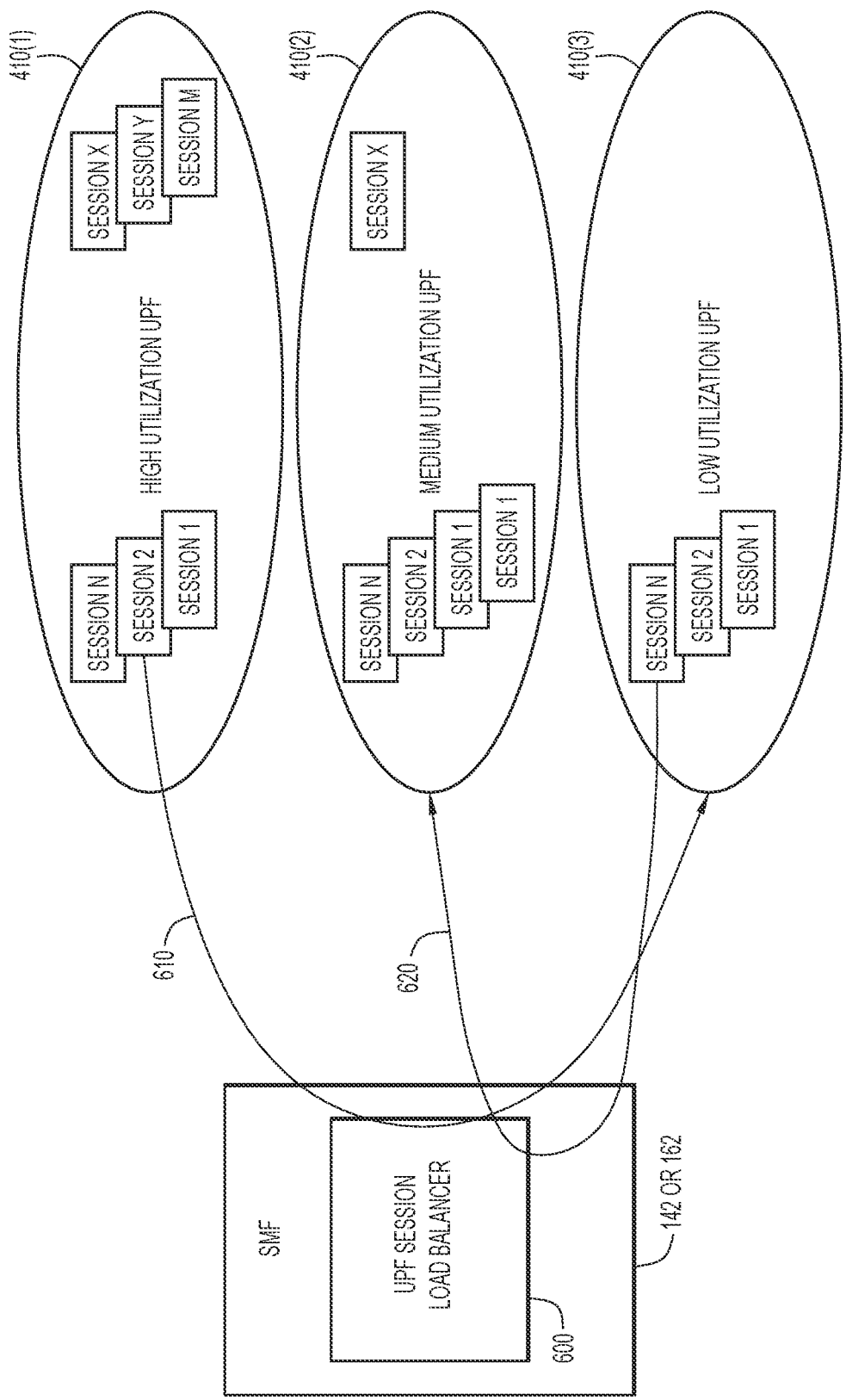
FIG. 6 is a diagram depicting operations performed to re-assign user plane traffic sessions between user plane functions based on resource utilization levels of the user plane functions, according to an example embodiment.

Reference is made to FIG. 6 for a description of the session load balancing process performed by a UPF Session Load Balancer function 600 of the SMF 142 or 162. The UPF Session Load Balancer function 600 identifies and relocates the sessions between different utilization categories of UPFs to achieve improved Quality of Experience. FIG. 6 shows a first UPF, e.g., UPF 410(1) that is currently marked as a HIGH utilization UPF, a second UPF, e.g., UPF 410(3) that is currently marked as a MEDIUM utilization UPF, and a third UPF, e.g., UPF 410(4) that is currently marked as a LOW utilization UPF.

For a HIGH utilization UPF, sessions that are relatively long duration (active for a period longer than a time duration threshold denoted "*min_sessiontime_for_UPF_relocation_threshold*") and having relatively high resource utilization (utilizing session manager resources greater than a threshold denoted "*max_sessionmgr_utilization_threshold*") the UPF Load Balancer Function 600 of the SMF 142 or 162 marks these sessions as potential candidates for relocation to a LOW utilization UPF within the same region (e.g., TAI) to enhance the Quality of Experience for the user. If there are no available LOW utilization UPFs, then the UPF Load Balancer Function 600 of the SMF 142 or 162 relocates the sessions to a MEDIUM utilization UPF. Thus, as an example, as shown at 610 in FIG. 6, the UPF Load Balancer Function 600 may relocate one or more of the sessions handled by the HIGH utilization UPF 410(1) to the LOW utilization UPF 410(4).

For LOW utilization UPF, sessions that are relatively long duration (active for a period longer than the "*min_sessiontime_for_UPF_relocation_theshold*") and having relatively low resource utilization (utilizing session manager resources less than a "*min_sessionmgr_utilization_theshold*"), the UPF Load Balancer Function 600 of the SMF 142 or 162 marks sessions as potential candidates for relocation to a HIGH utilization UPF or a MEDIUM utilization UPF within the same region to enhance the Quality of Experience for the users in the other UPFs. As an example, as shown at 620 in FIG. 6, the UPF Load Balancer Function 600 of the SMF 142 or 162 may relocate one or more of the sessions handled by the LOW utilization UPF 410(4) to the MEDIUM utilization UPF 410(3).

Figure 7:
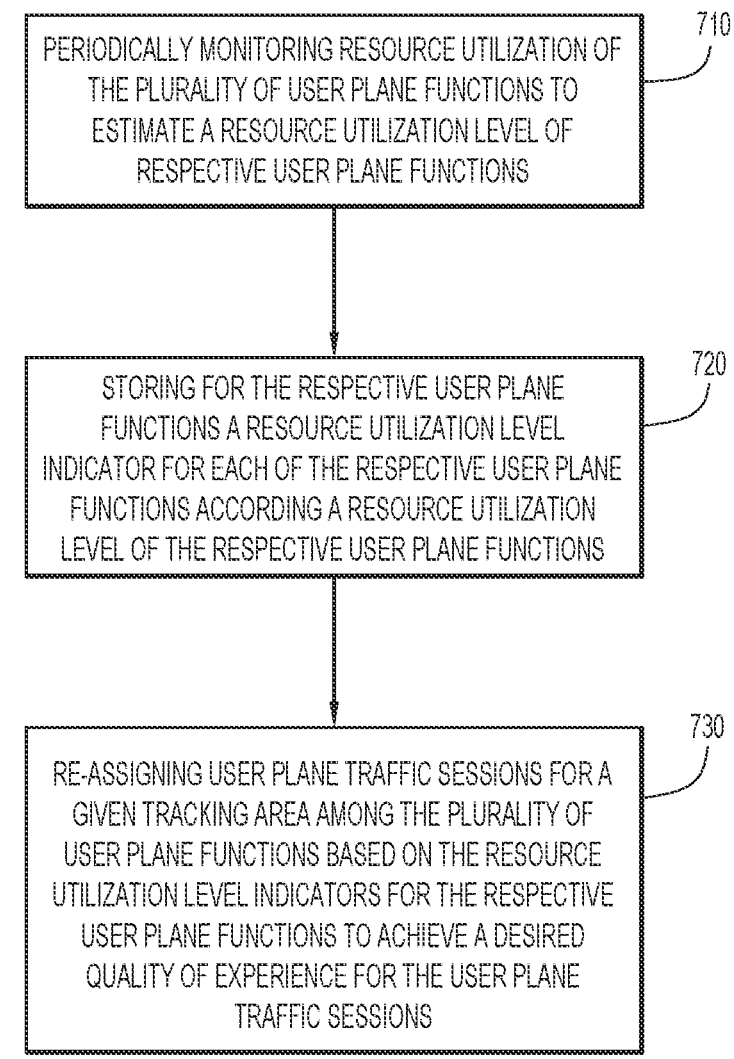
FIG. 7 is a flow chart of a process for resource selection among user plane functions, according to an example embodiment.

Turning now to FIG. 7, a flow chart is shown for a method 700 according to an example embodiment. The method 700 is performed in a network that includes a plurality of user plane functions that perform processing of user plane traffic sessions from one or more mobile wireless user devices. In one example, the operations of method 700 may be performed by a session management function in a core network portion of the network, as shown in FIG. 1. At 710, the session management function periodically monitors resource utilization of the plurality of user plane functions to estimate a resource utilization level of respective user plane functions. At 720, based on the periodically monitoring, the session management function stores, for the respective user plane functions, a resource utilization level indicator for each of the respective user plane functions according a resource utilization level of the respective user plane functions. At 730, the session management function re-assigns user plane traffic sessions for a given tracking area among the plurality of user plane functions based on the resource utilization level indicators for the respective user plane functions to achieve a desired quality of experience for the user plane traffic sessions.

The method 700 may further include, for new user plane traffic sessions within a slice and for the given tracking area, initially selecting user plane functions, of the plurality of user plane functions, which have lower resource utilization, on a round-robin basis.

In an example embodiment, the periodically monitoring function 710 may include defining a plurality of resource groups based on resource utilization level, and within a slice in the mobile network, assigning user plane functions to one of the plurality of resource groups based on resource utilization level of respective user plane functions. As an example, the plurality of resource groups include a high utilization resource group for user plane functions having a resource utilization greater than a first threshold, a low resource utilization group for user plane functions having a resource utilization less than a second threshold, and a medium resource utilization group for user plane functions having a resource utilization between the first threshold and the second threshold.

In an example embodiment, the periodically monitoring operation 710 may include a session management function running in a core network periodically providing a probe to each of the plurality of user plane functions, and obtaining from each of the plurality of user plane functions, a vector that includes utilization information including average central processor unit utilization since a previous poll, average available memory since a previous poll and average network throughput since a previous poll.

In an example embodiment, the re-assigning operation 730 includes moving from a relatively higher utilization user plane function to a relatively lower utilization user plane function, a user plane traffic session that is active longer than a time duration threshold and having a resource utilization greater than a maximum resource utilization threshold. Similarly, in an example embodiment, the re-assigning operation 730 includes moving from a relatively lower utilization user plane function to a relatively higher utilization user plane function, a user plane traffic session that is active longer than a time duration threshold and having a resource utilization less than a minimum resource utilization threshold.

FIG. 8 illustrates a hardware block diagram of a computing device 800 that may perform the functions of the SMF described above in connection with FIGS. 1-7. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions for UPF Resource Management Logic 817 that, when executed by the one or more processors 814, cause the computing device 800 to perform the operations of the SMF as depicted in FIGS. 1-7 and described above.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, is a communication interface provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, end-to-end network slicing is one of the major selling point for modern mobile networks. Achieving this involves coordination between different systems and reservation of the resources to meet the slice requirements. Techniques are presented herein to achieve better utilization of the network resources and ensure their availability for dynamic slice creations.

In one form, a method is provided in a network that includes a plurality of user plane functions that perform processing of user plane traffic sessions from one or more mobile wireless user devices, the method comprising: periodically monitoring resource utilization of the plurality of user plane functions to estimate a resource utilization level of respective user plane functions; based on the periodically monitoring, storing for the respective user plane functions a resource utilization level indicator for each of the respective user plane functions according a resource utilization level of the respective user plane functions; and re-assigning user plane traffic sessions for a given tracking area among the plurality of user plane functions based on the resource utilization level indicators for the respective user plane functions to achieve a desired quality of experience for the user plane traffic sessions.

In another form, an apparatus is provided that includes a communication interface configured to enable communications in a network with a plurality of user plane functions that perform processing of user plane traffic sessions from one or more mobile wireless user devices; a memory; and a processor configured to perform operations including: periodically monitoring resource utilization of the plurality of user plane functions to estimate a resource utilization level of respective user plane functions; based on the periodically monitoring, storing for the respective user plane functions a resource utilization level indicator for each of the respective user plane functions according a resource utilization level of the respective user plane functions; and re-assigning user plane traffic sessions for a given tracking area among the plurality of user plane functions based on the resource utilization level indicators for the respective user plane functions to achieve a desired quality of experience for the user plane traffic sessions.

In another form, one or more non-transitory computer readable storage media are provided encoded with software comprising computer executable instructions and when the software is executed operable to perform operations including: periodically monitoring resource utilization of a plurality of user plane functions to estimate a resource utilization level of respective user plane functions in a network that includes a plurality of user plane functions that perform processing of user plane traffic sessions from one or more mobile wireless user devices; based on the periodically monitoring, storing for the respective user plane functions a resource utilization level indicator for each of the respective user plane functions according a resource utilization level of the respective user plane functions; and re-assigning user plane traffic sessions for a given tracking area among the plurality of user plane functions based on the resource utilization level indicators for the respective user plane functions to achieve a desired quality of experience for the user plane traffic sessions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   periodically monitoring resource utilization of a plurality of user plane functions to estimate a resource utilization level of respective user plane functions;
   based on the periodically monitoring, storing a corresponding resource utilization level for the respective user plane functions; and
   re-assigning a user plane traffic session from a relatively lower utilization user plane function to a relatively higher utilization user plane function based on the user plane traffic session having a resource utilization level indicator less than a first resource utilization threshold, wherein the user plane traffic session is active longer than a time duration threshold.

2. The method of claim 1, for new user plane traffic sessions within a network slice and for a given tracking area, initially selecting user plane functions, of the plurality of user plane functions, which have lower corresponding resource utilization levels, on a round-robin basis.

3. The method of claim 1, wherein periodically monitoring includes:
   defining a plurality of resource groups based on the corresponding resource utilization level of the respective user plane functions; and
   within a network slice, assigning user plane functions to one of the plurality of resource groups based on the corresponding resource utilization level of the respective user plane functions.

4. The method of claim 3, wherein the plurality of resource groups include a high utilization resource group for user plane functions having a resource utilization level greater than a first threshold, a low resource utilization group for user plane functions having a resource utilization level less than a second threshold, and a medium resource utilization group for user plane functions having a resource utilization level between the first threshold and the second threshold.

5. The method of claim 1, wherein the periodically monitoring, storing, and re-assigning are performed by a session management function for each slice in a wireless network.

6. The method of claim 5, wherein periodically monitoring includes the session management function:
   periodically providing a probe to each of the plurality of user plane functions; and
   obtaining from each of the plurality of user plane functions, a vector that includes utilization information including average central processor unit utilization since a previous poll, average available memory since a previous poll, and average network throughput since a previous poll.

7. The method of claim 1, further comprising moving the user plane traffic session from the relatively higher utilization user plane function to another user plane function with a relatively lower utilization based on the user plane traffic session having the resource utilization level indicator less than a second resource utilization threshold.

8. An apparatus comprising:
   a communication interface configured to enable communications in a network with a plurality of user plane functions that perform processing of user plane traffic sessions from one or more mobile wireless user devices;
   a memory; and
   a processor configured to perform operations including:
      periodically monitoring resource utilization of the plurality of user plane functions to estimate a resource utilization level of respective user plane functions;
      based on the periodically monitoring, storing a corresponding resource utilization level for the respective user plane functions; and
      re-assigning a user plane traffic session from a relatively lower utilization user plane function to a relatively higher utilization user plane function based on the user plane traffic session having a resource utilization level indicator less than a first resource utilization threshold, wherein the user plane traffic session is active longer than a time duration threshold.

9. The apparatus of claim 8, wherein the processor is further configured to perform operations including: for new user plane traffic sessions within a network slice and for a given tracking area, initially selecting user plane functions, of the plurality of user plane functions, which have lower corresponding resource utilization, on a round-robin basis.

10. The apparatus of claim 8, wherein the processor is configured to perform the periodically monitoring by:
   defining a plurality of resource groups based on the corresponding resource utilization level of the respective user plane functions; and
   within a network slice, assigning user plane functions to one of the plurality of resource groups based on the corresponding resource utilization level of the respective user plane functions.

11. The apparatus of claim 10, wherein the plurality of resource groups include a high utilization resource group for user plane functions having a resource utilization level greater than a first threshold, a low resource utilization group for user plane functions having a resource utilization level less than a second threshold, and a medium resource utilization group for user plane functions having a resource utilization level between the first threshold and the second threshold.

12. The apparatus of claim 8, wherein the processor is configured to perform the periodically monitoring by:
   periodically providing a probe to each of the plurality of user plane functions; and
   obtaining from each of the plurality of user plane functions, a vector that includes utilization information including average central processor unit utilization since a previous poll, average available memory since a previous poll, and average network throughput since a previous poll.

13. The apparatus of claim 8, wherein the processor is configured to perform the periodically monitoring, storing, and re-assigning as part of a session management function in the network, and for each slice in the network.

14. The apparatus of claim 8, wherein the processor is configured to move the user plane traffic session from the relatively higher utilization user plane function to another user plane function with a relatively lower utilization based on the user plane traffic session having the resource utilization level indicator less than a second resource utilization threshold.

15. One or more non-transitory computer readable storage media encoded with software comprising computer executable instructions and when the software is executed operable to perform operations including:
   periodically monitoring resource utilization of a plurality of user plane functions to estimate a resource utilization level of respective user plane functions;
   based on the periodically monitoring, storing a corresponding resource utilization level for the respective user plane functions; and
   re-assigning a user plane traffic session from a relatively lower utilization user plane function to a relatively higher utilization user plane function based on the user plane traffic session having a resource utilization level indicator less than a first resource utilization threshold, wherein the user plane traffic session is active longer than a time duration threshold.

16. The one or more non-transitory computer readable media of claim 15, wherein the instructions include, for new user plane traffic sessions within a network slice and for a given tracking area, instructions for initially selecting user plane functions, of the plurality of user plane functions, which have lower corresponding resource utilization levels, on a round-robin basis.

17. The one or more non-transitory computer readable media of claim 15, wherein the instructions for periodically monitoring include instructions for:
   defining a plurality of resource groups based on the corresponding resource utilization level of the respective user plane functions; and
   within a network slice, assigning user plane functions to one of the plurality of resource groups based on the corresponding resource utilization level of the respective user plane functions.

18. The one or more non-transitory computer readable media of claim 15, wherein the instructions for periodically monitoring, storing, and re-assigning are performed by a session management function for each slice in a wireless network.

19. The one or more non-transitory computer readable media of claim 18, wherein the instructions for periodically monitoring include instructions for the session management function:
   periodically providing a probe to each of the plurality of user plane functions; and
   obtaining from each of the plurality of user plane functions, a vector that includes utilization information including average central processor unit utilization since a previous poll, average available memory since a previous poll, and average network throughput since a previous poll.

20. The one or more non-transitory computer readable media of claim 15, wherein the instructions for re-assigning include instructions for:
   moving the user plane traffic session from the relatively higher utilization user plane function to another user plane function with a relatively lower utilization based on the user plane traffic session having a resource utilization level less than a second resource utilization threshold.

* * * * *